United States Patent [19]

Sato

[11] Patent Number: 5,372,324
[45] Date of Patent: Dec. 13, 1994

[54] BAITCASTING REEL CONSTRUCTED TO ALLOW REMOVAL OF A SPOOL

[75] Inventor: Jun Sato, Sakai, Japan

[73] Assignee: Shimano Inc., Osaka, Japan

[21] Appl. No.: 8,705

[22] Filed: Jan. 25, 1993

[30] Foreign Application Priority Data

Jan. 28, 1992 [JP] Japan .................. 4-002490[U]

[51] Int. Cl.⁵ .................................. A01K 89/015
[52] U.S. Cl. .................................. 242/312; 242/289
[58] Field of Search ............ 242/310, 312, 313, 314, 242/315, 289

[56] References Cited

U.S. PATENT DOCUMENTS

| | | | |
|---|---|---|---|
| 764,348 | 7/1904 | Carter | 242/315 |
| 901,609 | 10/1908 | Gaskins | 242/313 |
| 4,422,600 | 12/1983 | Preston | 242/310 |
| 5,120,002 | 6/1992 | Kawai | 242/314 |
| 5,127,603 | 7/1992 | Morimoto | 242/310 |

FOREIGN PATENT DOCUMENTS 54-43031 12/1979 Japan .

*Primary Examiner*—Katherine Matecki
*Attorney, Agent, or Firm*—Dickstein, Shapiro & Morin

[57] ABSTRACT

A baitcasting reel has a spool rotatably supported on a spool shaft between side bodies for taking up a fishing line. One of the side bodies includes an outer case pivotable to expose an opening through which the spool and spool shaft are removable. Access may be made through this opening to screws interconnecting an inner frame and an outer case of the other side body.

11 Claims, 8 Drawing Sheets

5,372,324

BAITCASTING REEL CONSTRUCTED TO ALLOW REMOVAL OF A SPOOL

BACKGROUND OF THE INVENTION

1. Field of the Invention

This invention relates to a baitcasting reel, and more particularly to an improvement in a baitcasting reel having a first side body and a second side body arranged at opposite ends of a spool for supporting a spool shaft, in which a whole or part of the first side body defines a lid member which may be dislocated to expose an opening.

2. Description of the Related Art

A baitcasting reel as constructed above is disclosed in Japanese Utility Model Publication No. 54-43031, for example. The first side body of this reel which does not have a handle includes a first frame opposed to the spool, and a bearing for supporting the spool shaft. The bearing is separable from the first frame by operating a plate-like member interposed between the first frame and bearing. The bearing is separated to allow removal of the spool, which facilitates elimination of a backlash. This baitcasting reel has a further advantage of allowing a fishing line to be changed with the spool.

A conventional baitcasting reel having a similar construction to the above reel includes a lid corresponding to the bearing which allows removal of the spool. This lid is detachably attached to a frame. Normally the lid is provided on the first side body not having a handle. The second side body having the handle has an interior space defined by a second frame opposed to the spool and a second case covering the second frame. This interior space accommodates transmission gearing and a clutch mechanism for transmitting drive from the handle to the spool.

The second case and second frame defining this interior space are interconnected by screws inserted from an outer lateral surface of the second case to act as a connecting device. Heads of the screws project from the outer lateral surface of the second case. Thus, the heads tend to contact an angler's hand, which is not pleasant to the touch. There is room for improvement in this respect.

SUMMARY OF THE INVENTION

A primary object of the present invention is to provide an improved baitcasting reel having a lid, which is smooth to the touch.

Another object of the invention is to provide a baitcasting reel having a lid readily attachable to and detachable from a frame.

A further object of the invention is to provide a baitcasting reel easy to handle when a lid is detached from a frame.

The above objects are fulfilled, according to the present invention, by a baitcasting reel comprising a spool, a first side body and a second side body opposed to each other across the spool and supporting a spool shaft, a lid member defined by a whole or part of the first side body, and an opening exposed by dislocating the lid member, wherein the second side body includes a second frame disposed adjacent the spool, a second case for covering an outer side of the second frame, and a connecting device operable through the opening to interconnect the second frame and the second case.

This baitcasting reel has the following function and effect.

The above features may be arranged as shown in FIGS. 1 and 2, for example. For opening the lid member B, a knob 40 is turned to disengage lugs 43 formed on the lid member B from engaging pieces 42 formed on a reel body, to render the lid member B separable. An opening F is exposed when the lid member B is separated. Through this opening F, screws acting as the connecting device are inserted to interconnect the second frame 8' and second case 9'. After the connecting operation, the lid member B is restored to conceal the screws 48, so that heads of the screws 48 do not appear on outer surfaces. The connecting device 48 may be inserted and turned with ease when assembling the reel.

That is, according to the present invention, the lid member B is separable to expose the opening F. This opening F is effectively used when interconnecting the second frame and second case. This does not require a complicated construction, and maintains a smooth outer surface of the first side body A.

Thus, the baitcasting reel according to the present is smooth to the touch, which is realized by utilizing the construction having the lid member.

In a construction similar to the above but the connecting positions are in the second side body A', an opening F1 is exposed after dislocating the lid member B and removing the spool 3. The second frame 8' and second case 9' may be connected by an operation carried out through this opening F1. This construction provides function and effect similar to the above.

The baitcasting reel may have a whole or part of the lid member rotatable about an axis of the spool shaft, the whole or part of the lid member including a plurality of lugs engageable with engaging pieces formed on a reel body, whereby the lid member is rotated for attachment to and detachment from the reel body.

This construction has the following function and effect.

When the lid member is turned in one direction, the lugs engage the engaging pieces to fix the lid member to the reel body. When the lid member is turned in the other direction, the lugs are disengaged from the engaging pieces to render the lid member separable.

Thus, the lid member may be opened in a one-touch operation without using a special tool. For operating the connecting device, a series of operations from dislocation and restoration of the lid member, which are necessary in connection therewith, to manipulation of the connecting device may be carried out with the greater ease for the reduced operational load in dislocation and restoration of the lid member.

The baitcasting reel may have part of the lid member defining an openable knob having a plurality of engaging pieces for engaging lugs formed on a reel body, the knob being movable toward and away from the lid member, and biased away from the lid member by a spring.

When the knob is rotated, the knob is disengaged from the reel body and pushed away from the reel body by the spring. When the lid member is attached to the reel body, an outer surface of the knob does not protrude from the reel body. When the knob is disengaged, the spring protrudes the knob from an outer surface of the reel body. The angler may then grip the knob to operate the lid member.

The lid member may be supported on a pivotal axis extending parallel to an axis of the spool shaft from a reel body, the lid member being pivotable about and movable along the pivotal axis and biased away from the reel body by a spring.

This construction provides the following function and effect.

When the knob is rotated, the knob is disengaged from the reel body and the lid member is pushed away from the reel body by the spring to expose the opening F. Further, the lid member is pivotable about the pivotal axis to expose the opening to a large extent. The spring provides the advantage of automatically exposing the opening. After pivoting about and moving away along the pivotal axis, the lid member remains supported on the pivotal axis. Thus, the angler need not take the trouble of finding a place to store the lid member separated from the reel body.

In a further aspect of the invention, a baitcasting reel is provided in which a first side body includes a first frame disposed adjacent a spool, and a first case for coveting an outer side of the first frame, and a second side body includes a second frame disposed adjacent the spool, and a second case for coveting an outer side of the second frame, the first case being supported on a pivotal axis extending parallel to an axis of a spool shaft from a reel body, the first case being pivotable about and movable along the pivotal axis without falling off the pivotal axis and biased away from the first frame by a spring, the first case supporting a rotatable knob connectable to and disconnectable from the first frame and biased away from the first frame by a further spring, the first case being attachable to the first frame by connecting the knob to the first frame, and detachable from the first frame by disconnecting the knob from the first frame, the first frame defining a further opening in a position where the knob is connectable, the spool being removable through the further opening when the first case is caused to pivot about the pivotal axis and move away from the first frame, the connecting device being operable through the opening when the spool is removed, to connect and disconnect the second frame and the second case.

This construction provides the following function and effect.

When the knob is rotated, the knob is disengaged from the first frame, whereby the knob moves relative to the first case. At the same time, the knob moves with the first case away from the first frame under the biasing force of the spring, to become free. Actually, the knob and first case are pivotable about the pivotal axis to expose the opening in the first frame through which the spool may be removed. The connecting device may be operated through the further opening exposed after the spool is removed.

Thus, the first case exposes the opening only by rotating the knob, to allow removal of the spool. The series of operations may be carried out automatically by using the spring load.

The foregoing and other objects, features and advantages of the invention will be apparent from the following more particular description of preferred embodiments of the invention, as illustrated in the accompanying drawings.

BRIEF DESCRIPTION OF THE DRAWINGS

The drawings show a baitcasting reel according to the present invention, in which.

DETAILED DESCRIPTION OF THE PREFERRED EMBODIMENT

A baitcasting reel according to the present invention will be described in detail with reference to the drawings.

Figure 1:
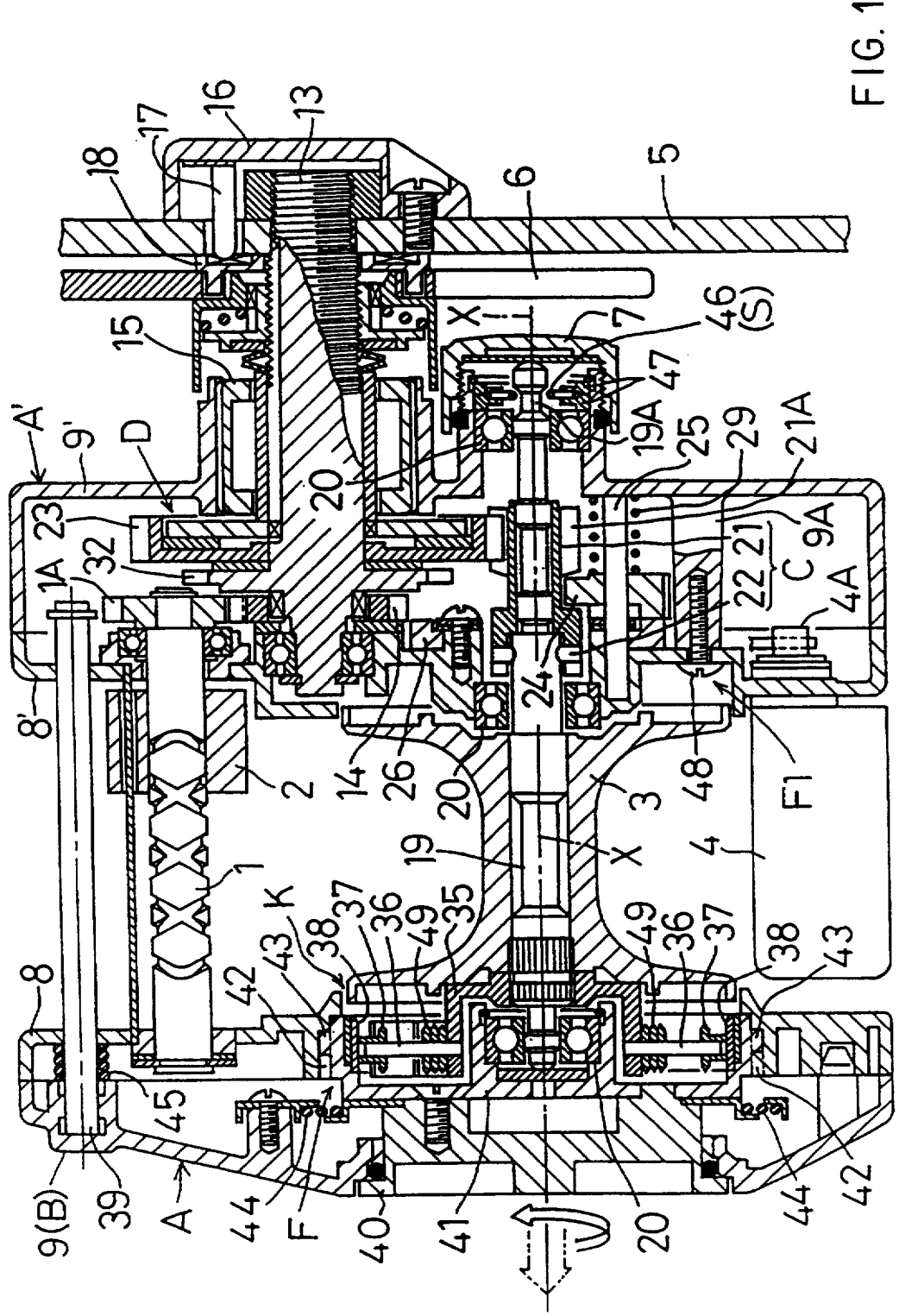
FIG. 1 is a plan view in cross section of the baitcasting reel.
Figure 2:
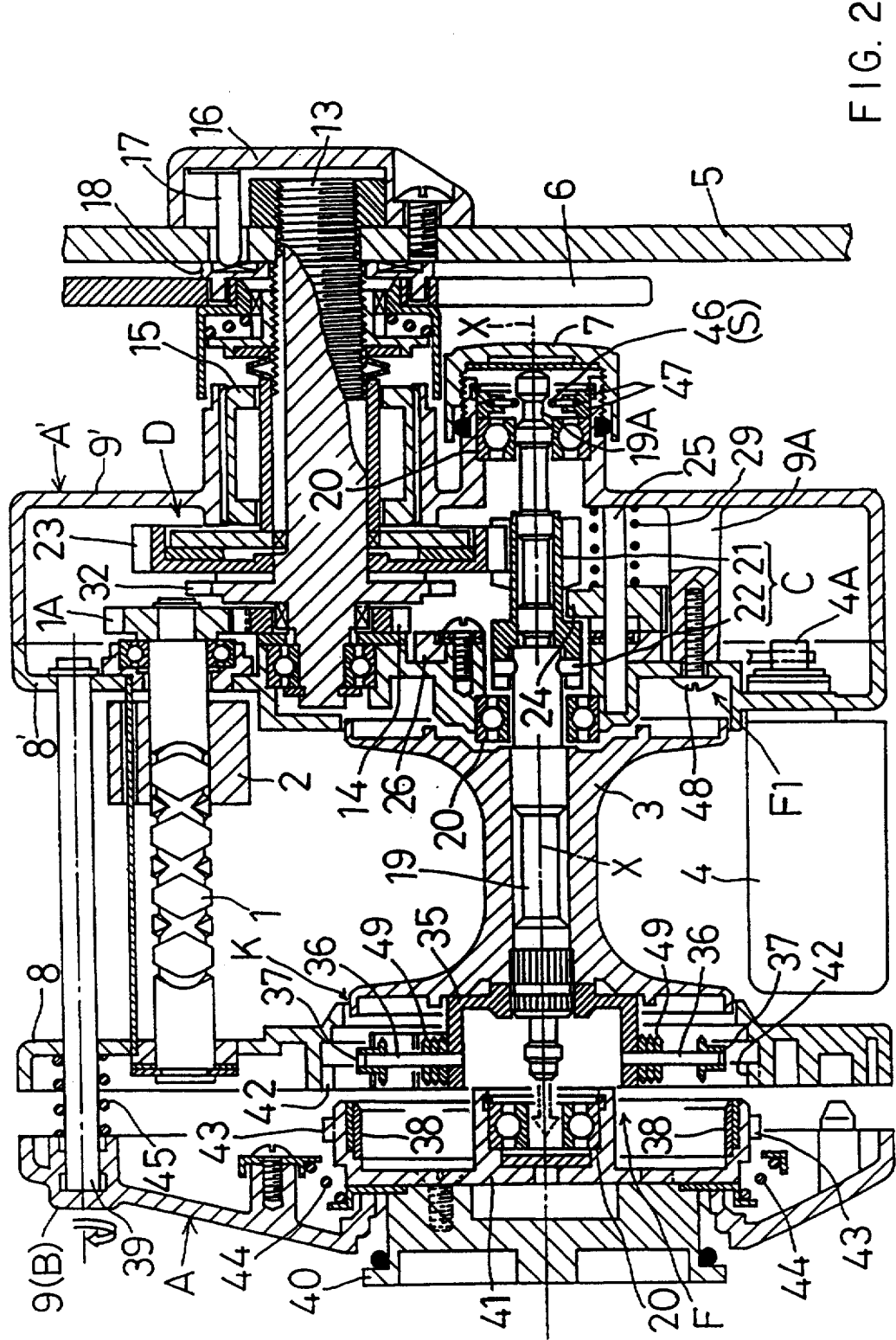
FIG. 2 is a plan view in cross section of the reel with a side body opened.
Figure 4:
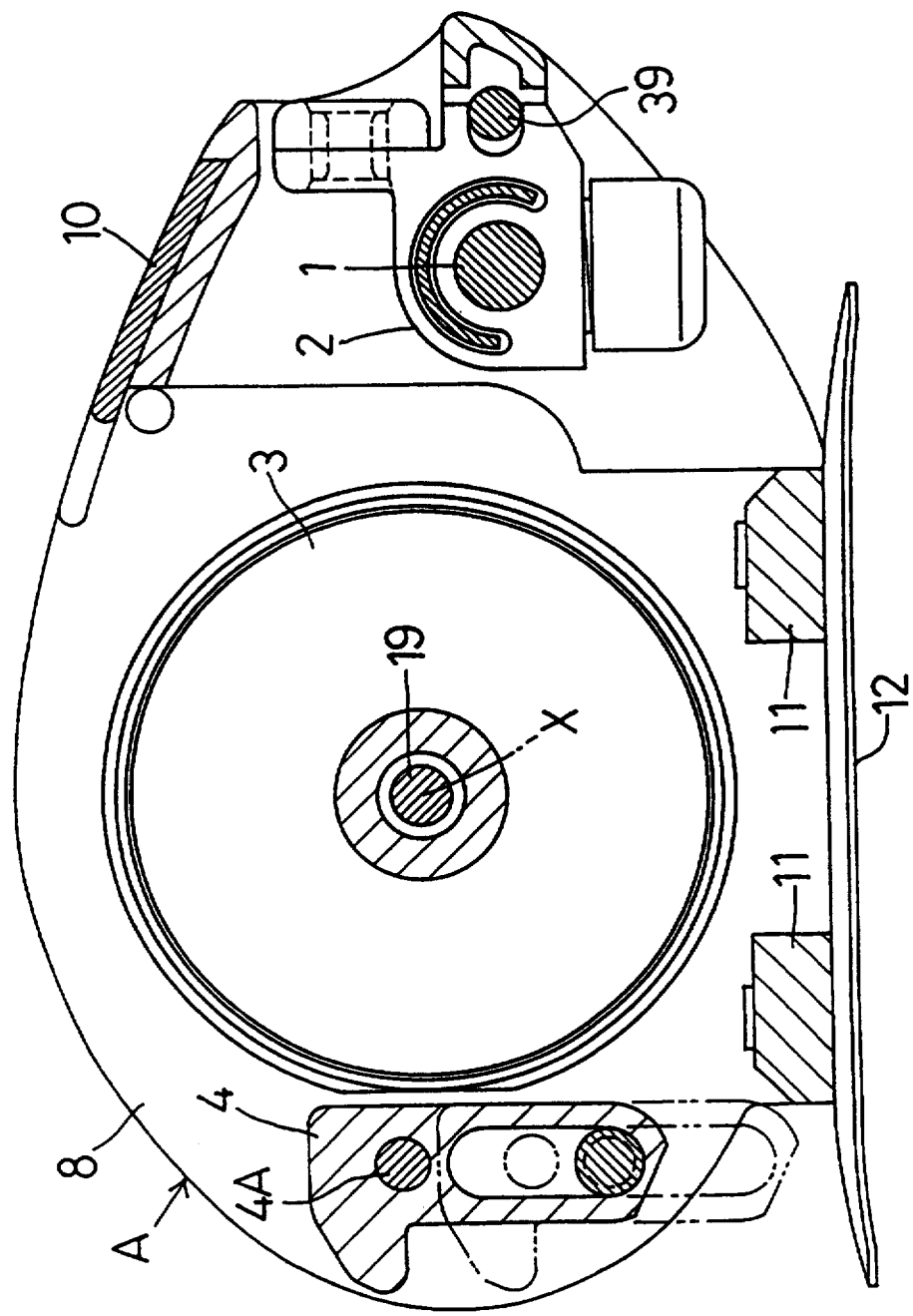
FIG. 4 is a side view in vertical section of the reel.

As shown in FIGS. 1, 2 and 4, the reel comprises a left side body A acting as a first side body, and a fight side body A' acting as a second side body. The side bodies A and A' support therebetween a level wind mechanism mounted in a forward position, a spool 3 mounted in a middle position, and a clutch controller 4 mounted rearwardly of the spool 3. The fight side body A' supports a handle 5, a drag controller 6 and a cast controller 7. The level wind mechanism includes a screw shaft 1, and a line guide 2 reciprocable right and left with rotation of the screw shaft 1.

Each of the side bodies A and A' includes a first or second, inner frame 8 or 8', and a first or second case 9 or 9' covering an outer side of the frame 8 or 8'. The left and fight frames 8 and 8' are formed integral with a thumb rest 10 disposed in an upper position therebetween, and a pair of front and rear lower frames 11 disposed in a lower position. A foot 12 extends between the lower frames 11. These components constitute a reel body.

A handle shaft 13 is supported by the right side body A'. The handle 5 and drag controller 6 are attached to a portion of the handle shaft 13 projecting from the second case 9'. The handle shaft 13 further supports a drag mechanism D and an output gear 14 mounted on an inward portion thereof lying inside the second case 9'. A roller type one-way clutch 15 is disposed between the handle shaft 13 and second case 9' to prevent backward turning of the handle 5. Drive is transmitted from the handle 5 through the output gear 14 to an input gear 1A on the screw shaft 1.

A clicking mechanism is provided on a surface of the drag controller 6 opposed to the handle 5. This mechanism includes a spring 17 attached to a retainer of the handle 5, and a disk 18 attached to the surface of the drag controller 6 for engaging the spring 17 to produce a clicking sound. This sound allows the angler to grasp an amount of operation of the drag controller 6.

A clutch mechanism C includes a clutch sleeve 21 slidably mounted on a spool shaft 19 supported by a plurality of bearings 20, and a pin 22 secured to the spool shaft 19 for engaging the sleeve 21. The clutch sleeve 21 has an input gear 21A meshed with an output gear 23 of the drag mechanism D. Thus, drive is transmitted from the handle 5 to the spool 3 through the drag mechanism D and clutch mechanism C.

Figure 3:
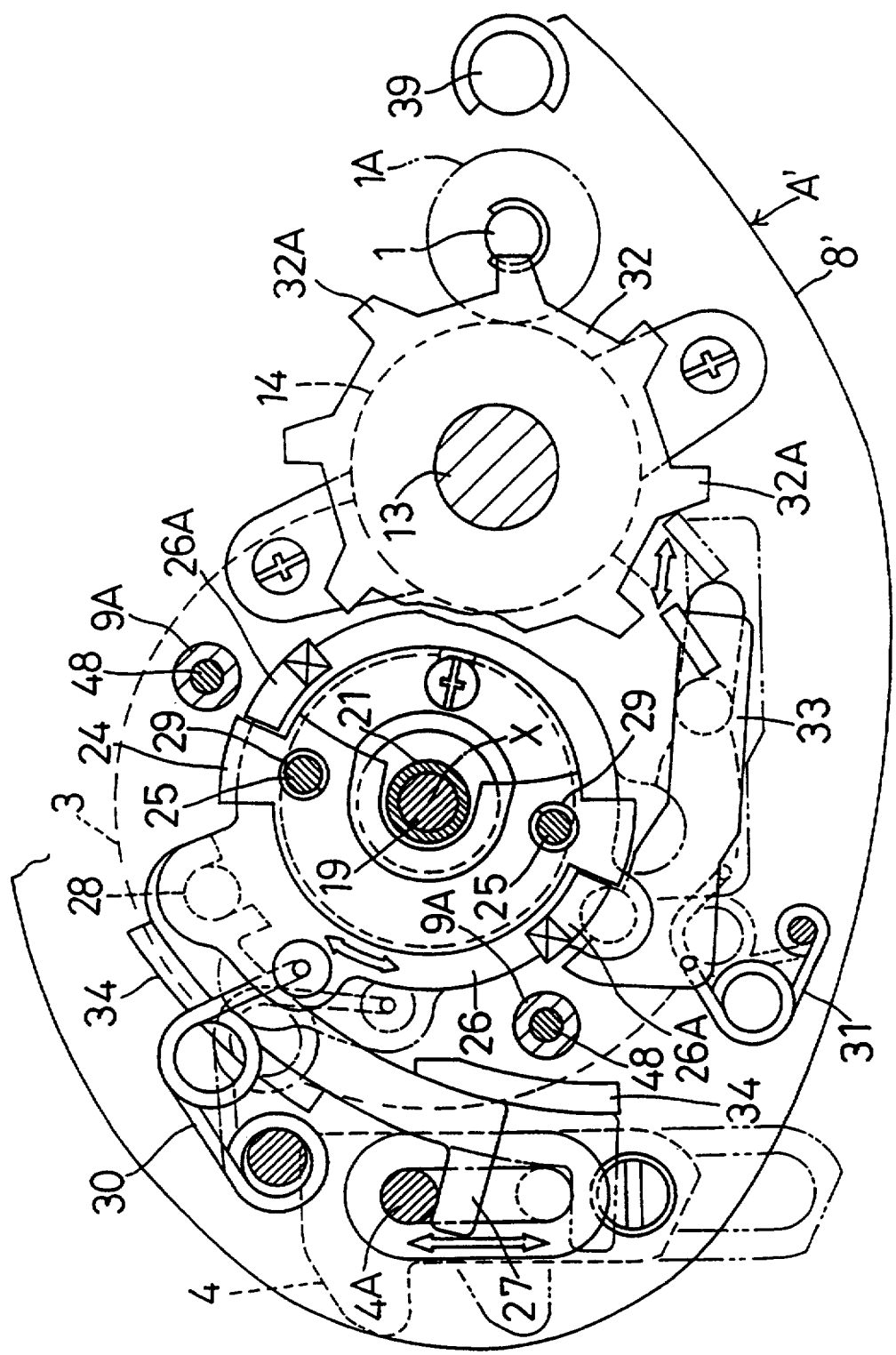
FIG. 3 is a side view of a clutch operating system.

As shown in FIG. 3, the clutch sleeve 21 is engaged with a shifter 24 slidably supported on a pair of support shafts 25. A rotary cam 26 rotatable about an axis X of the spool shaft 19 defines a pair of cam surfaces 26A for contacting the shifter 24. Thus, the rotary cam 26 operates the clutch sleeve 21 through the shifter 24. The rotary cam 26 has an engaging pin 28 engaged with a link element 27 operable through contact with a control pin 4A projecting from the clutch controller 4. The clutch controller 4 is operable to turn the link element 27, thereby to control the clutch sleeve 21.

Compression springs 29 are mounted on the support shafts 25 to bias the shifter 24 to a position to engage the clutch mechanism C. A toggle spring 30 acts on the rotary cam 26 to set the rotary cam 26 to a position to engage the clutch mechanism C and to a position to disengage the clutch mechanism C. The rotary cam 26 is interlocked to a return arm 33 on which a further toggle spring 31 acts. When the clutch mechanism C is disengaged, the toggle spring 31 switches an end of the return arm 33 to a position to interfere with a return wheel 32.

When disengaging the clutch mechanism C, the clutch controller 4 is depressed. Then the pin 4A formed integral with the clutch controller 4 acts on the link element 27 whereby the link element 27 moves describing an arcuate locus along a guide 34. As a result, the link element 27 rotates the rotary cam 26. Then the cam surfaces 26A of the rotary cam 26 push the clutch sleeve 21 in a declutching direction. When engaging the clutch mechanism C, the handle 5 is turned in a direction to take up a fishing line. This causes a tooth 32A of the wheel 32 to push the return arm 33, whereby the rotary cam 26 is rotated in a clutch engaging direction. Consequently, the cam surfaces 26A retract from the clutch sleeve 21, and the shifter 24 moves under the biasing force of compression springs 29 to the position to engage the clutch mechanism C.

Figure 6:
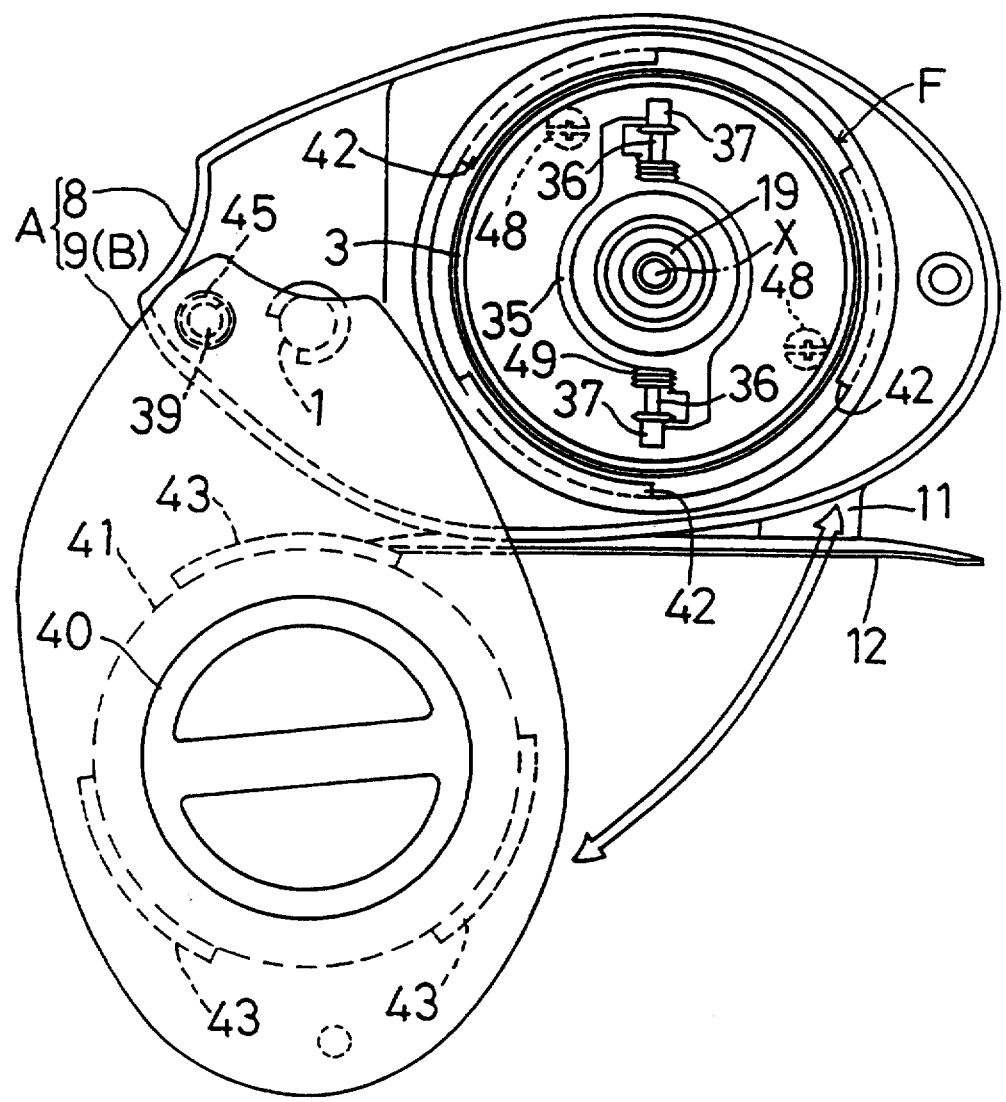
FIG. 6 is a side view of the reel with the side body opened.

As shown in FIGS. 1 and 6, the left side body A contains a centrifugal brake mechanism including collars 37 and an annular friction member 38. The collars 37 are slidably mounted on rods 35 extending from a holder 35 fixed to the spool shaft 19. The annular friction member 38 is disposed outwardly of a locus of revolution of the collars 37.

The first, left case 9 is separable from the first frame 8. After its separation, the first case 9 is pivotably supported by a front axis 39. Thus, the first case 9 is dislocated, without being completely separated from the first frame 8, to provide a large opening laterally of the first frame 9 to allow removal of the spool 3.

Figure 9:
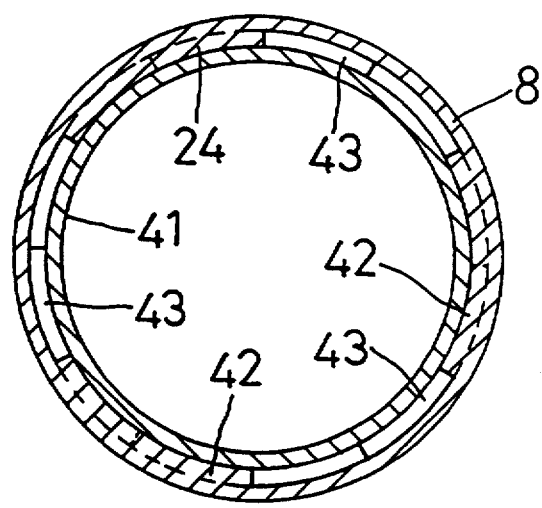
FIG. 9 is a sectional view showing engaging pieces and engaging lugs.

The first, left case 9 (one example of lid member) includes a knob 40 rotatable coaxially with the spool 3 and shiftable along the axis X of the spool shaft 19. The knob 40 is formed integral with a disk-like member 41 including one of the bearings 20 for supporting the spool shaft 19, and the friction member 38. As shown in FIGS. 6 and 9, the disk-like member 41 defines a plurality of lugs 43, while the fist frame 8 defines a plurality of engaging pieces 42 arranged along an inner periphery of a center opening K thereof. With rotation of the disk-like member 41, the lugs 43 are movable into and out of engagement with the engaging pieces 42, to switch between a position to lock the first case 9 to the first frame 8 and a position to separate the first case 9 from the first frame 8. The engaging pieces 42 and lugs 43 are movable into and out of engagement with each other by rotation through a relatively small angle, e.g. 10 to 30 degrees.

When the knob 40 is turned to cancel the engagement between the engaging pieces 42 and lug 43, the knob 40 and disk-like member 41 are pushed outward by the biasing force of a spring 44 as shown in FIG. 2. At the same time, the first case 9 is pushed away from the first frame 8 by the biasing force of a spring 45 mounted on the axis 39.

The spool 3 may be removed through the opening K appearing when the first case 9 is separated from the first frame 8. In order to prevent the spool 9 from falling off by gravity when the first case 9 is opened as noted above, a spring 46 is engaged with a small diameter portion 19A formed adjacent an end of the spool shaft 19.

Figure 5:
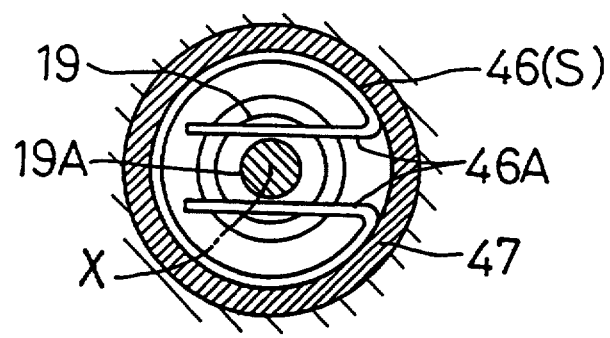
FIG. 5 is a sectional view showing a shape of a spring.

As shown in FIG. 5, the spring 46 includes a pair of engaging portions 46A nipping the small diameter portion 19A therebetween. The spring 46 is supported adjacent the cast controller 7 through an annular holder 47. The spring 46 is elastically deformable, when the spool 3 is manually pushed or pulled, to move into and out of engagement with the small diameter portion 19A.

As shown in FIGS. 1 and 3, the second frame 8' and second case 9' on the right side are interconnected by screws 48 (one example of connecting device). These screws 48 are inserted from a space (an opening F1) which receives the spool 3, and meshed into bosses 9A formed on the second case 9' to interconnect the second frame 8' and second case 9'. The screws 48 may be separated from the bosses 9A through the opening F1 to which access may be made through an opening F exposed after the first case 9 (lid member) is dislocated.

Thus, the screws 48 are disposed inside the reel body and in a plane of projection of the spool 3 as seen axially of the spool 3. The heads of these screws 48 are not exposed on outer surfaces of the reel, so that the outer surfaces of the reel are smooth and pleasant to the touch.

In use, the first case 9 may be opened in a one-touch operation of the knob 40. Even when the resulting opening F is directed downward inadvertently, the spring 46 prevents the spool 3 from falling off. When the spool 3 is manually pulled out with force, the spring 46 disengages from the small diameter portion 19 A of the spool shaft 19 to allow removal of the spool 3. After the spool 3 is removed, access may be made to the opening F1 to manipulate the screws 48 and disassemble the fight side body A'.

Figure 7:
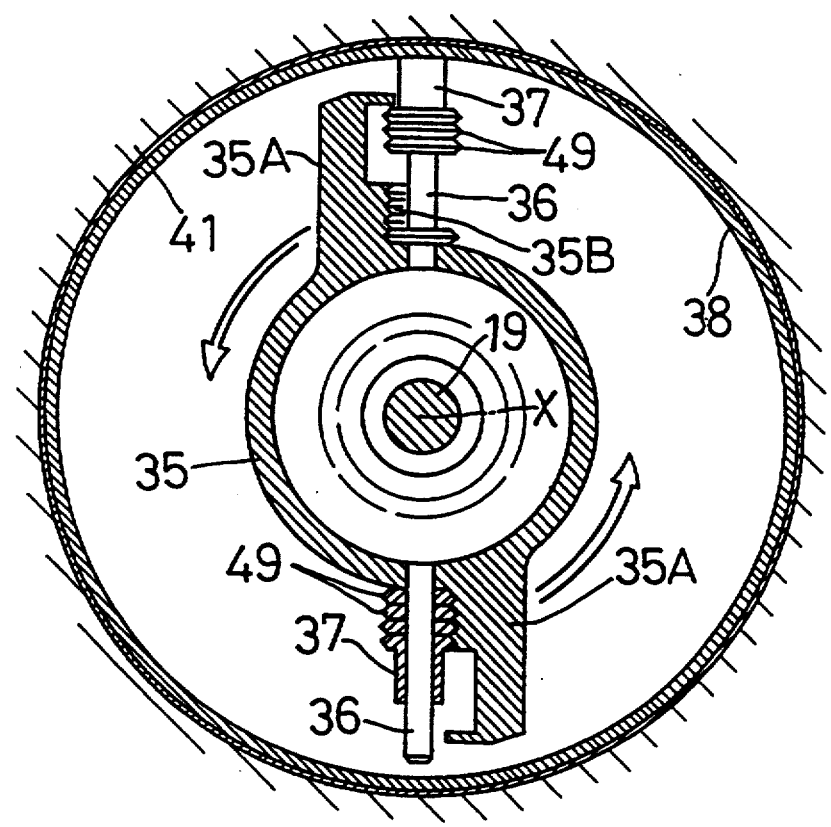
FIG. 7 is a sectional view of a brake mechanism.
Figure 8:
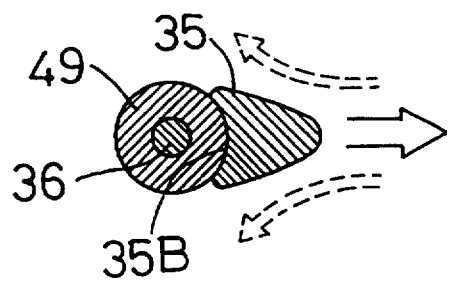
FIG. 8 is a sectional view of an arm of a holder.

As shown in FIGS. 7 and 8, the brake mechanism includes a pair of arms 35A formed on the holder 35 and defining retaining portions 35B for engaging and retaining a plurality of weights 49 or collars 37. The collars 37 and weights 49 may be freed and separated from the retaining function of the retaining portions 35B to apply a greater braking force than where only the collars 37 are used. The braking force may be varied by varying the number of weights 49 freed and separated. Conversely, the braking force may be eliminated by causing the retaining portion 35B to retain the collars 37. Further, as shown in FIG. 8, each of the arms 35A may be shaped to receive little air resistance, thereby to avoid application of an unnecessary braking force.

The foregoing embodiment may be modified as follows.

The frame and case may be interconnected at positions remote from the spool receiving space, such as positions adjacent the level wind mechanism. The connecting device may comprise one screw or a plurality of screws. Further, the connecting device may comprise a rod or rods, and a snap ring or rings for engaging the rod or rods.

Figure 10:
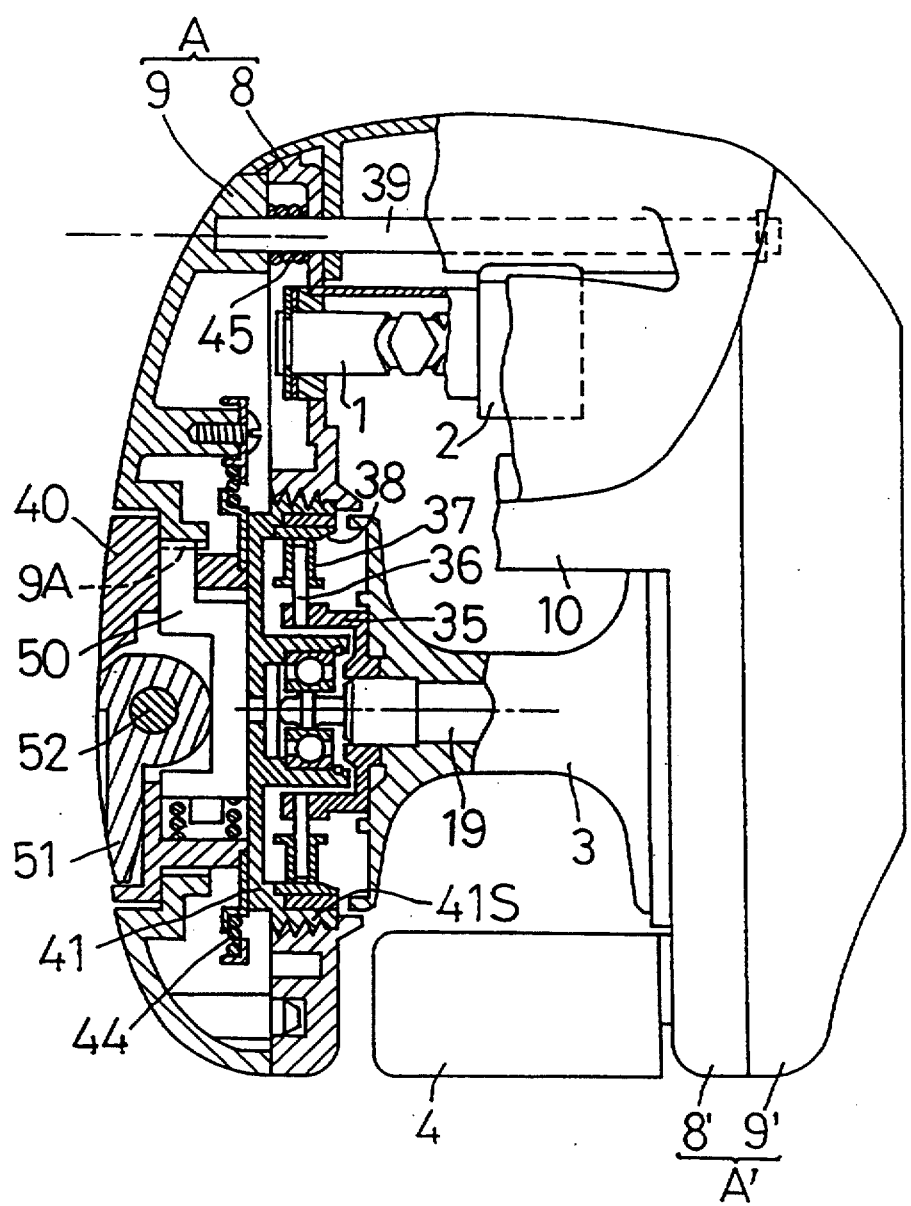
FIG. 10 is a side view, partly in section, showing a meshing structure between a knob and a first frame.
Figure 11:
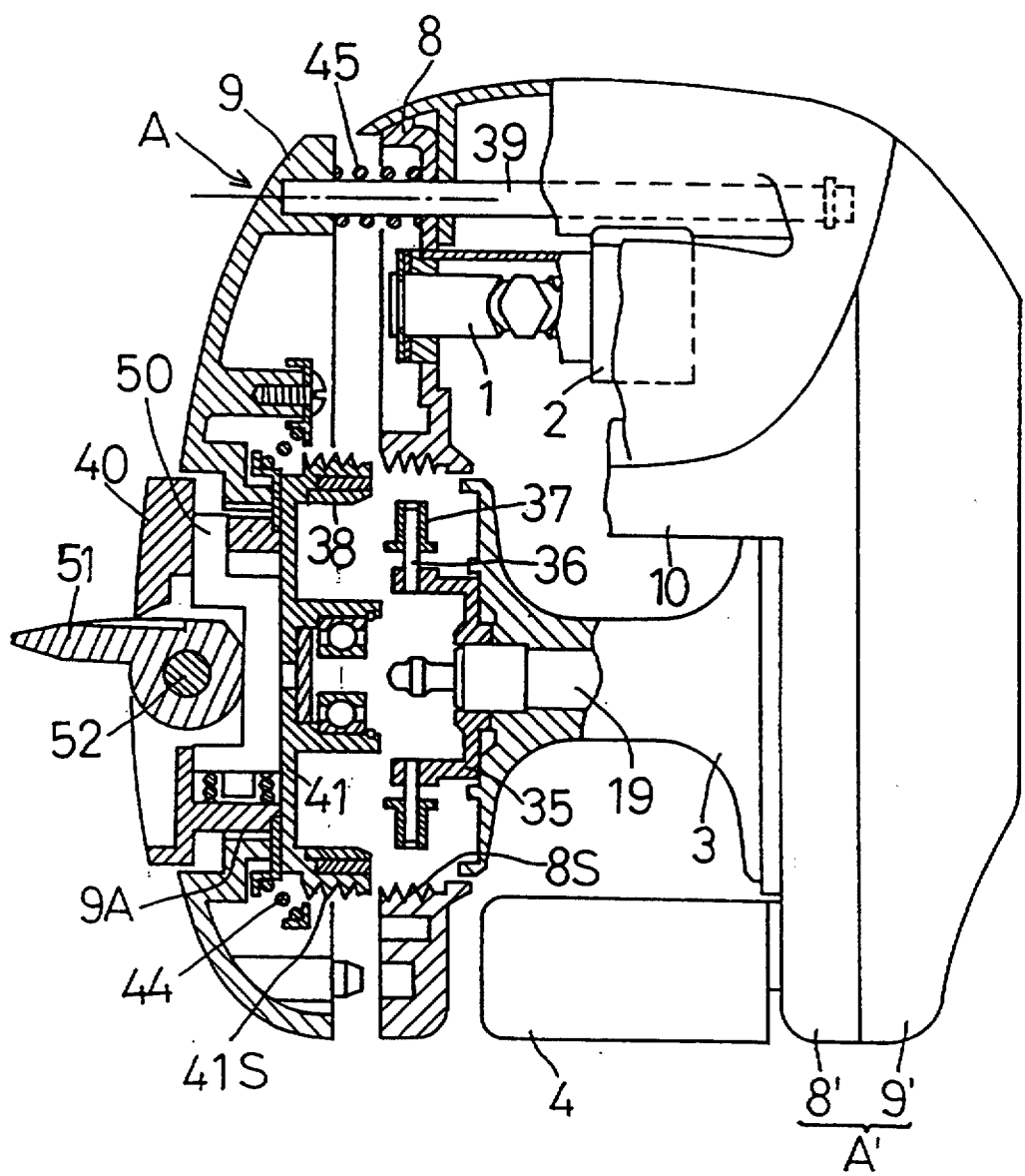
FIG. 11 is a side view, partly in section, corresponding to FIG. 10 and showing a first case separated from the first frame.

According to the present invention, a screw type meshing structure may be provided between the entire lid member or pan of the lid member and the reel body, so that entire lid member or pan thereof is rotatable relative to the reel body for connection thereto and disconnection therefrom. Particularly, as shown in FIGS. 10 and 11, the first case 9 may support a rotatable knob 40 acting as a lid member, and a disk-like member 41 attached to an inner surface of the knob 40 may define a male screw 41S peripherally thereof for engaging a female screw 8S formed on an inner periphery of the opening K in the first frame 8. Numeral 50 in FIGS. 10 and 11 denotes a locking piece for acting on an engaging portion 9A of the first case 9. Numeral 51 denotes a lock control device rotatable about an axis 52 to operate the locking piece 50.

The side body supporting the handle may have a lid member which may be opened to allow access to the frame and case remote from the handle to connect and disconnect these frame and case.

The opening according to the present invention may be a relatively small opening for receiving a screw driver. The screw driver is used to turn the screws for connecting and disconnecting the frame and case. The frame and case not having the lid member may be connected by means of screws inserted from outside the case as in the prior art. These screws may be used with the connecting device according to the present invention.

What is claimed is:

1. A baitcasting reel comprising:
    a spool supported on a spool shaft;
    a reel body including a first side body and a second side body opposed to each other across said spool and supporting said spool shaft, said first side body including a first frame disposed on the side of said first side body adjacent said spool and a first case disposed on the opposite side of said first side body, said second side body including a second frame disposed on the side of said second side body adjacent said spool and a second case disposed on the opposite side of said second body;
    an opening in said reel body;
    a shaft member extending parallel to said spool shaft, said first case being mounted on an end of said shaft member to be movable about and along an axis of said shaft member;
    control means supported on said first case, said control means being movable relative to said first case;
    a bearing provided on said first case for supporting an end of said spool shaft;
    attaching means for connecting said first frame with said control means thereby connecting said first case to said first frame;
    wherein said control means is operable to enable said first frame and said first case to be disconnected from each other enabling said first case to be moved along the axis of said shaft member away from said spool and then about the axis of said shaft member, whereby said first case is displaced from said first frame to expose said opening in said reel body; and
    said reel further comprising:
    connecting means accessible through said opening to interconnect said second frame and said second case.

2. A baitcasting reel as defined in claim 1, wherein said control means comprises a knob.

3. A baitcasting reel as defined in claim 2, wherein said attaching means includes a plurality of lugs provided on said knob and a plurality of engaging pieces provided on said first frame, said first case and said first frame being attached to and detached from each other in response to rotating said knob about said spool axis to selectively engage and disengage said lugs and said engaging pieces.

4. A baitcasting reel as defined in claim 2, wherein said attaching means comprises a screw meshing structure on said knob and said first frame, said knob and said first frame being selectively engaged and disengaged from each other in response to a relative rotation therebetween.

5. A baitcasting reel as defined in claim 2, wherein said knob is biased in a direction parallel to said spool axis away from said spool relative to said first case by a spring interposed between said knob and said first case.

6. A baitcasting reel as defined in claim 2, wherein said knob comprises a rotatable knob;
    said first case being removably attached to said first frame by fixing said knob to said first frame;
    said first case being detached from said first frame by detaching said knob from said first frame; and
    wherein said spool is withdrawable from said reel body through said first frame when said first case is detached from said first frame.

7. A baitcasting reel as defined in claim 2, wherein said first case is biased away from said first frame by a first spring and wherein said first case is fixed to said shaft member;
    said knob comprising a rotatable knob held by said first case, said knob being biased away from said first frame by a second spring;
    said first case being removeably attached to said first frame by fixing said knob to said first frame;
    said first case being detached from said first frame by detaching said knob from said first frame; and
    wherein said spool is withdrawable from said reel body through said first frame when said first case is detached from said first frame.

8. A baitcasting reel as defined in claim 1, wherein said connecting means extends through said second frame to be accessible through said opening.

9. A baitcasting reel as defined in claim 1, wherein said first case is biased away from said first frame by a spring.

10. A baitcasting reel as defined in claim 1, wherein, in the direction along said spool axis, a distance between said spool shaft and said connecting means is shorter than a radius of said spool.

11. A baitcasting reel comprising:
    a spool supported on a spool shaft;
    a reel body including a first side body and a second side body opposed to each other across said spool and supporting said spool shaft, said first side body including a first frame disposed on the side of said first side body adjacent said spool and a first case disposed on the opposite side of said first side body, said second side body including a second frame disposed on the side of said second side body adjacent said spool and a second case disposed on the opposite side of said second side body;

a knob movable relative to said first case with the knob being supported by said first case, said knob being urged away from said first case by a spring interposed between said knob and said first case;

attaching means for connecting said first frame with said knob;

an opening in said reel body, wherein said opening is exposed by disconnecting said first frame from said knob, detaching said first case from said first frame and removing said spool; and connecting means extending through said second frame and accessible through said opening to interconnect said second frame and said second case.

* * * * *